(12) United States Patent
Chiyo (10) Patent No.: US 10,573,456 B2
(45) Date of Patent: Feb. 25, 2020

(54) COIL UNIT, WIRELESS POWER TRANSMITTING DEVICE, WIRELESS POWER RECEIVING DEVICE, AND WIRELESS POWER TRANSMISSION SYSTEM

(71) Applicant: TDK CORPORATION, Tokyo (JP)

(72) Inventor: Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 165 days.

(21) Appl. No.: 15/913,076

(22) Filed: Mar. 6, 2018

(65) Prior Publication Data

US 2018/0261383 A1    Sep. 13, 2018

(30) Foreign Application Priority Data

Mar. 9, 2017    (JP) .................. 2017-044467

(51) Int. Cl.
| | |
|---|---|
| H01F 38/14 | (2006.01) |
| H04B 5/00 | (2006.01) |
| H02J 50/70 | (2016.01) |
| H01F 27/28 | (2006.01) |
| H01F 27/36 | (2006.01) |
| H02J 50/12 | (2016.01) |

(52) U.S. Cl.
CPC ......... *H01F 38/14* (2013.01); *H01F 27/2871* (2013.01); *H01F 27/365* (2013.01); *H02J 50/12* (2016.02); *H02J 50/70* (2016.02); *H04B 5/0037* (2013.01); *H04B 5/0075* (2013.01)

(58) Field of Classification Search
CPC .......... H01F 38/14; H01F 27/28; H01F 27/36; H02J 50/10; H02J 50/12; H04B 5/0037; H04B 5/0075

USPC .......................................................... 307/104
See application file for complete search history.

(56) References Cited

U.S. PATENT DOCUMENTS

| | | | |
|---|---|---|---|
| 2010/0320843 A1 | 12/2010 | Kitamura et al. | |
| 2012/0248892 A1 | 10/2012 | Covic et al. | |
| 2015/0213950 A1 | 7/2015 | Yuasa | |
| 2015/0279555 A1* | 10/2015 | Chiyo | H01F 38/14 307/104 |
| 2015/0279556 A1* | 10/2015 | Chiyo | B60L 53/30 307/104 |

(Continued)

FOREIGN PATENT DOCUMENTS

| | | |
|---|---|---|
| JP | 2015142019 A | 8/2015 |
| JP | 2016073059 A | 5/2016 |
| JP | 2016129164 A | 7/2017 |

*Primary Examiner* — Hal Kaplan
(74) *Attorney, Agent, or Firm* — Young Law Firm, P.C.

(57) ABSTRACT

Disclosed herein is a coil unit for wirelessly transmitting or receiving power by magnetic coupling with a first coil wound in a planar spiral shape. The coil unit includes a second coil that is wound in a planar spiral shape with a smaller wound area than that of the first coil and has an opening, and a magnetic member that is arranged along a surface of the second coil on an opposite side as viewed from the first coil. The magnetic member is constituted by a plurality of magnetic bodies being spaced from each other. Each of the magnetic bodies is arranged to overlap both a winding portion of the second coil and the opening in plan view. A distance between two adjacent magnetic bodies among the magnetic bodies is 3% or more and 30% or less of a maximum width of the second coil.

10 Claims, 10 Drawing Sheets

(56) References Cited

U.S. PATENT DOCUMENTS

2016/0093433 A1 3/2016 Endou et al.
2017/0040845 A1 2/2017 Yuasa et al.
2018/0166210 A1 6/2018 Araki et al.

* cited by examiner

COIL UNIT, WIRELESS POWER TRANSMITTING DEVICE, WIRELESS POWER RECEIVING DEVICE, AND WIRELESS POWER TRANSMISSION SYSTEM

BACKGROUND OF THE INVENTION

Field of the Invention

The present invention relates to a coil unit, a wireless power transmitting device, a wireless power receiving device, and a wireless power transmission system.

Description of Related Art

In recent years, a wireless power transfer technique, which uses electromagnetic induction between a primary (power transmitting) coil and a secondary (power receiving) coil opposed to each other to charge a moving body such as a mobile device and an electric vehicle, has been attracting attention. With regard to this technique, there has been examined a technique in which a capacitor is connected in series to or in parallel with a coil to constitute a resonant circuit, thereby realizing transfer with high efficiency and low loss.

Japanese Patent Application Laid-Open No. 2016-073059 discloses a non-contact power transfer device that uses the wireless power transfer technique described above to perform power transfer. This non-contact power transfer device is constituted by a primary coil provided in a transmission-side member and a secondary coil provided in a receiving-side member, and performs power transfer when the secondary coil is in a magnetic field generated by the primary coil. A magnetic body is provided on each of a surface of the primary coil on an opposite side as viewed from the secondary coil and a surface of the secondary coil on an opposite side as viewed from the primary coil. The reason why the magnetic bodies are provided in this manner is to increase a transmission distance by increasing inductance of a coil. The outer diameter of the secondary coil is set to 0.3 to 0.7 times the outer diameter of the primary coil. This configuration also aims to increase the transmission distance.

The inventor of the present application is studying a configuration in which a resonant circuit is provided for each of the primary coil and the secondary coil in the configuration described in Japanese Patent Application Laid-Open No. 2016-073059 in order to achieve wireless power transfer with higher efficiency and lower loss. However, in his studies, it has been found that power transfer efficiency may be lowered when the resonant circuit is simply configured, despite the intention of the inventor.

SUMMARY

It is therefore an object of the present invention to provide a coil unit, a wireless power transmitting device, a wireless power receiving device, and a wireless power transmission system with higher efficiency and lower loss.

A coil unit according to the present invention is a coil unit for wirelessly transmitting or receiving power by magnetic coupling with a first coil wound in a planar spiral shape, the coil unit comprising a second coil that is wound in a planar spiral shape with a smaller wound area than that of the first coil and has an opening, and a magnetic member that is arranged along a surface of the second coil on an opposite side as viewed from the first coil, wherein the magnetic member is constituted by a plurality of magnetic bodies being spaced from each other, each of the magnetic bodies is arranged to overlap both a winding portion of the second coil and the opening in plan view, and a first distance that is a separation distance between two adjacent magnetic bodies among the magnetic bodies is 3% or more and 30% or less of a maximum width of the second coil.

A wireless power transmitting device according to the present invention is a wireless power transmitting device comprising a coil unit that transmits power wirelessly and a power converting circuit that converts input direct-current power to alternating-current power and supplies the alternating-current power to the coil unit, wherein the coil unit is any of the coil units described above.

A wireless power receiving device according to the present invention is a wireless power receiving device comprising a coil unit that receives power wirelessly and a rectifying circuit that converts alternating-current power received by the coil unit to direct-current power, wherein the coil unit is any of the coil units described above.

A wireless power transmission system according to the present invention is a wireless power transmission system for wirelessly transferring power, comprising a power transmitting coil unit that transmits power wirelessly and a power receiving coil unit that receives power wirelessly, wherein either one of the power transmitting coil unit and the power receiving coil unit is any of the coil units described above.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

First, the finding of the inventor's study will be explained before explaining an embodiment of the present invention.

Figure 9:
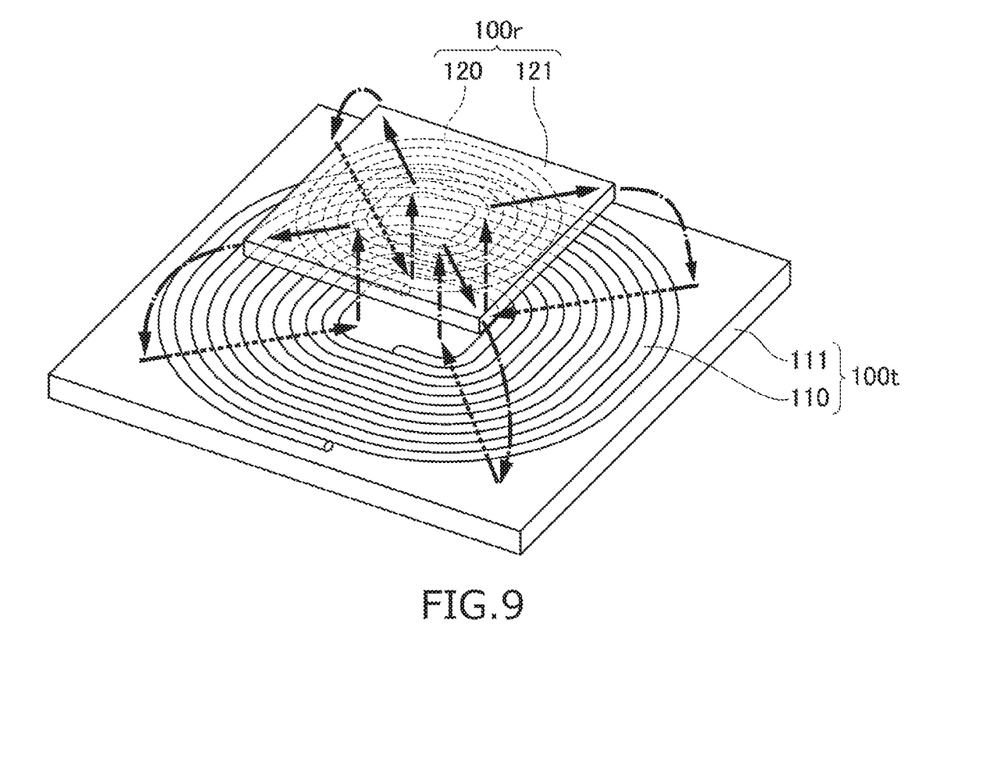
FIGS. 9 and 10 are perspective views illustrating coil units according to a background technique of the present invention.
Figure 10:
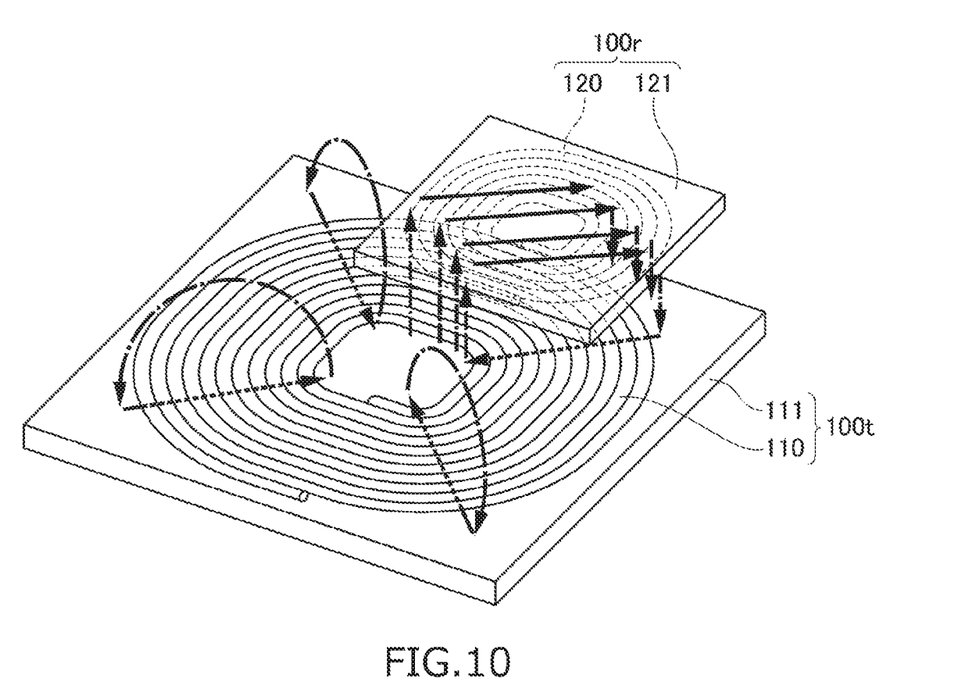

FIGS. 9 and 10 are perspective views illustrating coil units 100t and 100r according to a background technique of the present invention. As illustrated in FIGS. 9 and 10, the coil unit 100t is configured to include a primary coil 110 wound in a planar spiral shape with a relatively larger wound area and a magnetic member 111, and the coil unit 100r is configured to include a secondary coil 120 wound in a planar spiral shape with a relatively smaller wound area and a magnetic member 121. The coil units 100t and 100r are arranged in such a manner that the primary coil 110 and the secondary coil 120 face each other.

FIG. 9 illustrates a state where the coil units 100t and 100r are arranged in such a manner that the center of the primary coil 110 and the center of the secondary coil 120 match each other as viewed in plan view. In this case, a path of a magnetic flux generated by causing a current to flow through the primary coil 110 has a shape that passes through center portions of the primary coil 110 and the secondary coil 120 and then turns to outside of the primary coil 110 and the secondary coil 120. In this manner, the magnetic flux generated in the primary coil 110 is interlinked with the secondary coil 120.

FIG. 10 illustrates a state where a displacement has occurred in a relation between a planar position of the primary coil 110 and that of the secondary coil 120. In this case, in the magnetic flux generated in the primary coil 110, there is generated a portion that passes through the magnetic member 121 without being interlinked with the secondary coil 120. The presence of such a magnetic flux increases a total generation amount of the magnetic flux in the primary coil 110, which results in increase of inductance of the primary coil 110. When the inductance of the primary coil 110 increases in this manner, a resonant state of the resonant circuit constituted by each of the primary coil 110 and the secondary coil 120 is changed, so that power transfer efficiency is lowered.

Such lowering of power transfer efficiency also occurs similarly in a case where the wound area of the primary coil and that of the secondary coil are reversed. That is, the problem described above can be generalized as follows. In a case of using a first coil with a relatively larger wound area and a second coil with a relatively smaller wound area that are arranged to face each other, when a displacement occurs in a relation between planar positions of those coils, inductance of the first coil is largely changed, resulting in a change of a resonant state of a resonant circuit constituted by each of the first coil and the second coil, and the change of the resonant state lowers the power transfer efficiency.

Accordingly, an object of the present invention is to provide a coil unit, a wireless power transmission device, a wireless power receiving device, and a wireless power transmission system that can suppress a change of inductance of a first coil when a displacement has occurred in a relation between planar positions of the first coil with a relatively larger wound area and a second coil with a relatively smaller wound area, in a case of using the first coil and the second coil that are arranged to face each other.

Figure 1:
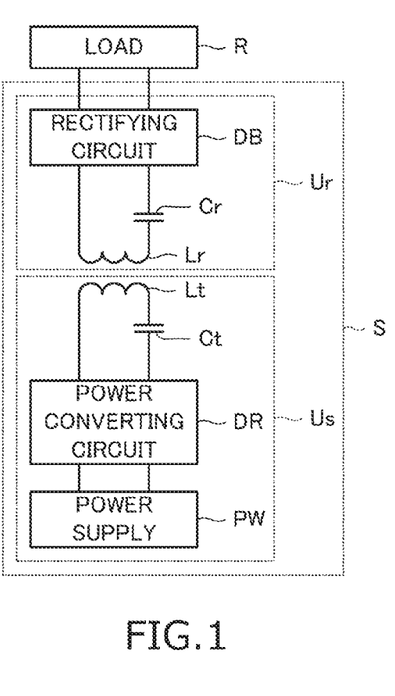
FIG. 1 is a diagram illustrating a configuration of a wireless power transmission system according to an embodiment of the present invention.

Now, an embodiment of the present invention will be described in detail. FIG. 1 is a diagram illustrating a configuration of a wireless power transmission system S according to an embodiment of the present invention. The wireless power transmission system S is an apparatus for transferring power wirelessly, and includes, as illustrated in FIG. 1, a wireless power transmitting device Us that transmits power wirelessly and a wireless power receiving device Ur that receives power wirelessly.

For example, the wireless power transmission system S is used for supplying power to a mobile device such as a smartphone, and a vehicle such as an electric vehicle. In a case where a mobile device such as a smartphone is an object of power supply, the wireless power transmitting device Us is a power-supply pad placed on a table or the like, for example, and the wireless power receiving device Ur is a device incorporated in the mobile device. In a case where a vehicle such as an electric vehicle is an object of power supply, the wireless power transmitting device Us is a power supply device installed on the road or in the ground, for example, and the wireless power receiving device Ur is a device mounted on the vehicle.

As illustrated in FIG. 1, the wireless power transmitting device Us is a device including a power supply PW, a power converting circuit DR, a capacitor Ct, and a power transmitting coil unit Lt.

The power supply PW is a power supply device that outputs direct-current power. Specifically, a direct-current power supply obtained by rectifying and smoothing a commercial alternating-current power supply, a secondary battery, a direct-current power supply using solar power, and a switching power-supply device such as a switching converter can be suitably used as the power supply PW.

The power converting circuit DR has a function of converting direct-current power (input direct-current power) output from the power supply PW to alternating-current power. Specifically, the power converting circuit DR is constituted by a switching circuit in which a plurality of switching elements are connected in bridge connection. Examples of the switching elements include elements such as a MOS-FET (Metal Oxide Semiconductor-Field Effect Transistor) and an IGBT (Insulated Gate Bipolar Transistor).

The power transmitting coil unit Lt and the capacitor Ct are connected between a positive output terminal and a negative output terminal of the power converting circuit DR to constitute a resonant circuit. The capacitor Ct can be connected in series to the power transmitting coil unit Lt or in parallel therewith. Further, the capacitor Ct can include a plurality of capacitors, and these capacitors can be connected in series to, in parallel with, or in series-parallel with the power transmitting coil unit Lt. The alternating-current power output from the power converting circuit DR causes generation of an alternating-current signal vibrating with a predetermined frequency in the resonant circuit constituted by the power transmitting coil unit Lt and the capacitor Ct. The power transmitting coil unit Lt generates a magnetic field by this alternating-current signal, thereby having a function of wirelessly transmitting the alternating-current power. The configuration of the power transmitting coil unit Lt is described in detail later.

As illustrated in FIG. 1, the wireless power receiving device Ur is a device including a power receiving coil unit Lr, a capacitor Cr, and a rectifying circuit DB.

The power receiving coil unit Lr and the capacitor Cr are connected between a positive input terminal and a negative input terminal of the rectifying circuit DB to constitute a resonant circuit. The capacitor Cr can be connected in series to the power receiving coil unit Lr or in parallel therewith. Further, the capacitor Cr can include a plurality of capacitors, and they can be connected in series to, in parallel with, or in series-parallel with the power receiving coil unit Lr. When the power receiving coil unit Lr enters into the magnetic field generated by the power transmitting coil unit Lt, an alternating-current signal that vibrates with a predetermined frequency is generated in the resonant circuit constituted by the power receiving coil unit Lr and the capacitor Cr. In this manner, the power receiving coil unit Lr has a function of receiving the alternating-current power that has been wirelessly transmitted by the power transmitting coil unit Lt. The configuration of the power receiving coil unit Lr is also described later in detail.

The rectifying circuit DB has a function of rectifying the alternating-current power received by the power receiving coil unit Lr to direct-current power. A specific example of the rectifying circuit DB is a converting circuit that has a full-wave rectifying function using a diode bridge and a power smoothing function using a capacitor and a three-terminal regulator. The direct-current power rectified by the rectifying circuit DB is output to a load R.

For example, in a case where the wireless power transmission system S is applied to a power supply device for a vehicle, such as an electric vehicle, the load R is a secondary battery or a rotary machine included in a vehicle or both of them. In a case where the load R is an alternating-current rotary machine, it is necessary to constitute the wireless power receiving device Ur by adding an inverter (not illustrated) between the rectifying circuit DB and the load R to allow alternating-current power to be supplied to the load R.

Figure 2:
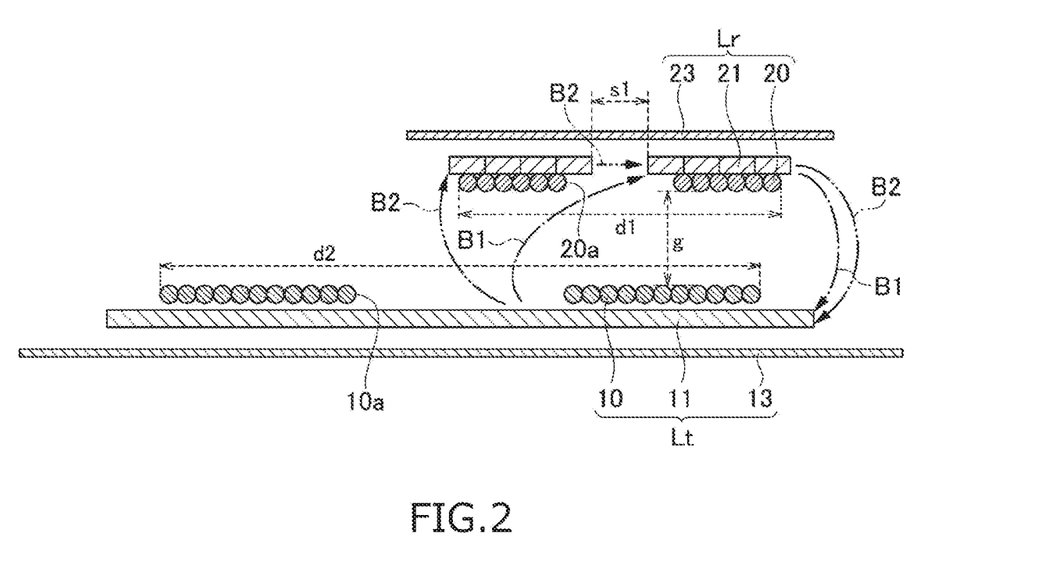
FIG. 2 is a schematic cross-sectional view of the coil units according to the embodiment of the present invention.
Figure 3A:
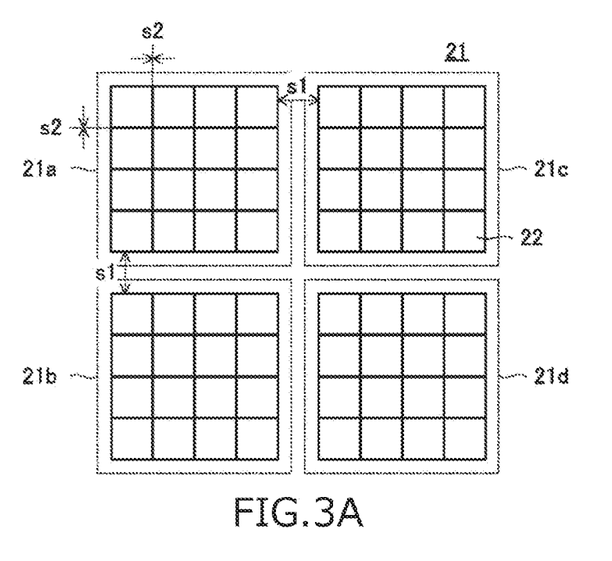
FIG. 3A is a schematic plan view of a magnetic member according to the embodiment of the present invention.
Figure 3B:
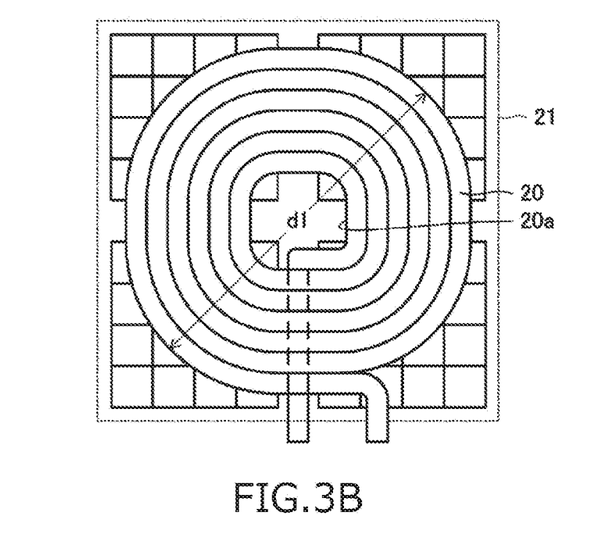
FIG. 3B is a schematic plan view of a power receiving coil and the magnetic member according to the embodiment of the present invention.

FIG. 2 is a schematic cross-sectional view of the coil units Lt and Lr according to the present embodiment. FIG. 3A is a schematic plan view of a magnetic member 21 according to the present embodiment, and FIG. 3B is a schematic plan view of a power receiving coil 20 and the magnetic member 21 according to the present embodiment. Details of the configurations of the coil units Lt and Lr are described below with reference to FIGS. 2, 3A, and 3B.

As illustrated in FIG. 2, the power transmitting coil unit Lt is configured to include a power transmitting coil 10 (first coil), a magnetic member 11, and an electromagnetic shielding plate 13. As illustrated in FIG. 2, the power receiving coil unit Lr includes the power receiving coil 20 (second coil), the magnetic member 21, and an electromagnetic shielding plate 23.

Each of the power transmitting coil 10 and the power receiving coil 20 is a planar spiral coil wound in a planar spiral shape having a substantially square shape including a space at its center in which no winding is formed. The shapes of the power transmitting coil 10 and the power receiving coil 20 in plan view are not specifically limited to any shape, and can be substantially circular. A Litz wire formed of copper or aluminum is used as a specific material of the winding in both the power transmitting coil 10 and the power receiving coil 20. In the following descriptions, portions at the centers of the power transmitting coil 10 and the power receiving coil 20 in which no winding is formed are respectively referred to as "opening $10a$" and "opening $20a$". Although not illustrated in FIG. 2, one end of the power transmitting coil 10 is connected to a positive output terminal of the power converting circuit DR (see FIG. 1), and the other end of the power transmitting coil 10 is connected to a negative output terminal of the power converting circuit DR. One end of the power receiving coil 20 is connected to a positive input terminal of the rectifying circuit DB (see FIG. 1), and the other end of the power receiving coil 20 is connected to a negative input terminal of the rectifying circuit DB. In a case where the capacitor Ct is connected in series to the power transmitting coil unit Lt, the power transmitting coil 10 is connected to the power converting circuit DR via the capacitor Ct. Similarly, in a case where the capacitor Cr is connected in series to the power receiving coil unit Lr, the power receiving coil 20 is connected to the rectifying circuit DB via the capacitor Cr.

The power receiving coil 20 is wound with a smaller wound area as compared to that of the power transmitting coil 10. The wound area described herein is an area of a region surrounded by an outermost periphery of each coil (including an opening), for example. It suffices that the specific ratio of wound area between the power receiving coil 20 and the power transmitting coil 10 is determined as appropriate in accordance with a facing distance g described later, desired power transfer efficiency, and the like. For example, it is suitable to set the wound area of the power receiving coil 20 to $\frac{1}{10}$ to $\frac{1}{2}$ of the wound area of the power transmitting coil 10.

The magnetic member 11 is a rectangular (or square) magnetic body in a shape of a plate arranged along a surface of the power transmitting coil 10 on an opposite side as viewed from the power receiving coil 20. The specific area and specific shape of the magnetic member 11 are set in such a manner that the entirety of the power transmitting coil 10 is included within the magnetic member 11 in plan view. The magnetic member 11 serves as a magnetic path of a magnetic flux generated in the power transmitting coil 10.

The magnetic member 21 is a magnetic body arranged along a surface of the power receiving coil 20 on an opposite side as viewed from the power transmitting coil 10. The magnetic member 21 is constituted by a plurality of magnetic bodies arranged in a matrix to be spaced from each other. In the example of FIG. 3A, the number of magnetic bodies constituting the magnetic member 21 is four (magnetic bodies $21a$ to $21d$). However, the number of magnetic bodies constituting the magnetic member 21 is not limited to four. Descriptions are continued below while assuming the configuration of FIG. 3A.

As illustrated in FIG. 3A, the magnetic bodies $21a$ to $21d$ are arranged with a gap with a certain width s1 (first distance) therebetween. The suitable value for the width s1 is described later. The first distance that is a separation distance between two magnetic bodies adjacent in a column direction among the magnetic bodies and the first distance that is a separation distance between two magnetic bodies adjacent in a row direction among the magnetic bodies can be different from each other. Each of the magnetic bodies $21a$ to $21d$ is constituted by an aggregate of a plurality of magnetic pieces 22. In the example of FIG. 3A, each of the magnetic bodies $21a$ to $21d$ is constituted by an aggregate of 16 square magnetic pieces 22 that are arranged in a matrix. However, the number of the magnetic pieces 22 constituting each of the magnetic bodies $21a$ to $21d$ is not limited to 16. The number of the magnetic pieces 22 can be different between the magnetic bodies $21a$ to $21d$. As illustrated in FIG. 3A, the magnetic pieces 22 in one magnetic body are arranged with a gap with a certain width s2 (second distance)

therebetween. It is preferable that the distance s2 is 50% or less of the distance s1. FIG. 3A illustrates an example where s2 is 0 mm.

As exemplified in FIG. 3B, an area of the magnetic member 21 as a whole (including the gaps between the magnetic bodies 21a to 21d and the gaps between the magnetic pieces 22) and a shape thereof are set in such a manner that the entirety of the power receiving coil 20 is included within the outer periphery of the magnetic member 21 in plan view. The magnetic member 21 also serves as a magnetic path of the magnetic flux generated in the power transmitting coil 10.

The arrangement of the magnetic bodies 21a to 21d is determined in such a manner that each of the magnetic bodies 21a to 21d overlaps both a winding portion of the power receiving coil 20 and the opening 20a in plan view. More specifically, it is preferable to arrange the magnetic bodies 21a to 21d in such a manner that a total area of regions of the opening 20a that overlap the respective magnetic bodies 21a to 21d is 10% or more of the area of the opening 20a it its entirety in plan view. With this arrangement, a magnetic path that is interlinked with the power receiving coil 20 can be easily formed, and thus it is possible to effectively suppress lowering of magnetic coupling between the power transmitting coil 10 and the power receiving coil 20.

The electromagnetic shielding plate 13 is a metal plate arranged along a surface of the magnetic member 11 on an opposite side as viewed from the power transmitting coil 10. The electromagnetic shielding plate 23 is a metal plate arranged along a surface of the magnetic member 21 on an opposite side as viewed from the power receiving coil 20. These plates function to prevent electromagnetic waves generated in the power transmitting coil 10 and the power receiving coil 20 from leaking to outside.

One of the features of the wireless power transmission system S according to the present embodiment is that the magnetic member 21 is constituted by the magnetic bodies 21a to 21d spaced from each other. This feature is described below in more detail with reference also to FIGS. 4 and 5.

Figure 4:
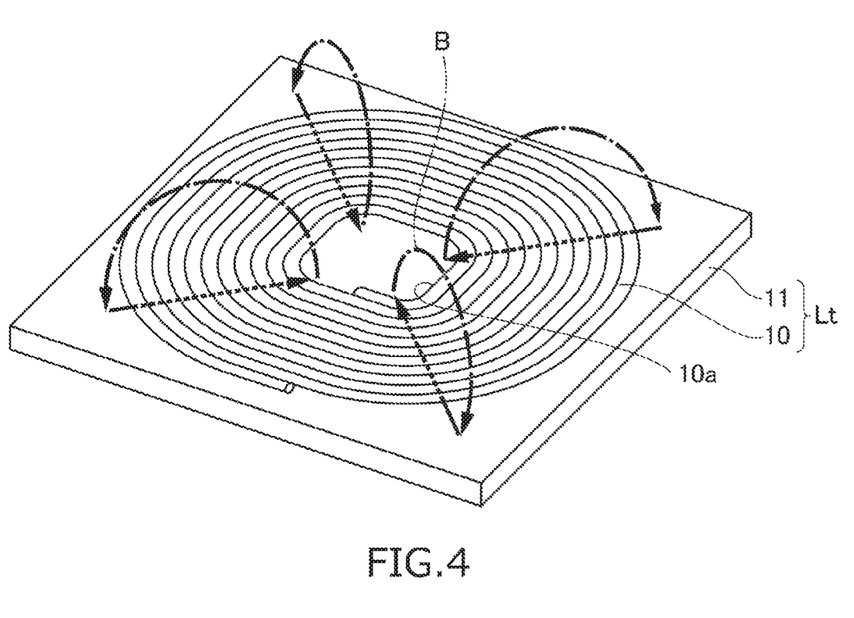
FIG. 4 is a perspective view illustrating the power transmitting coil unit according to the embodiment of the present invention.
Figure 5:
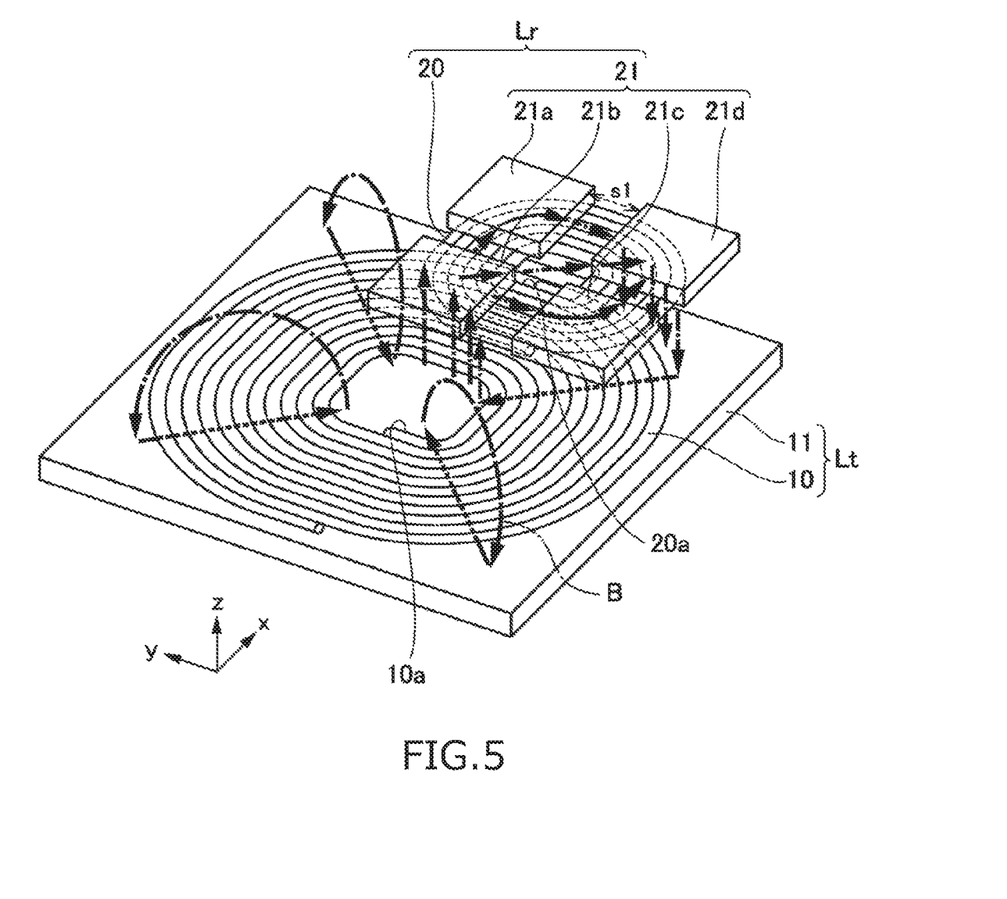
FIG. 5 is a perspective view illustrating the coil units according to the embodiment of the present invention.

FIG. 4 is a perspective view illustrating the power transmitting coil unit Lt according to the present embodiment. FIG. 5 is a perspective view illustrating the coil units Lt and Lr according to the present embodiment.

First, descriptions are given with reference to FIG. 4. When alternating-current power is supplied from the power converting circuit DR illustrated in FIG. 1 to the power transmitting coil 10, a magnetic flux B is generated around the winding of the power transmitting coil 10 in accordance with the alternating-current power. As illustrated in FIG. 4, the magnetic flux B passes through the opening 10a upward (in a direction towards the power receiving coil 20) or downward. The magnetic flux B below the power transmitting coil 10 passes through the magnetic member 11.

In a case where the power receiving coil unit Lr is arranged to establish a positional relation illustrated in FIG. 9 with respect to the power transmitting coil unit Lt that is in a state illustrated in FIG. 4 (that is, in a case where the coil units Lt and Lr are arranged in such a manner that the center of the power transmitting coil 10 and the center of the power receiving coil 20 match each other in plan view), the magnetic flux B exiting from the opening 10a is interlinked with the power receiving coil 20. This interlinkage causes alternating-current power to be generated in the power receiving coil 20, so that transmission of power from the wireless power transmitting device Us to the wireless power receiving device Ur is realized.

However, in the wireless power transmission system S in practice, it is not always possible to arrange the coil units Lt and Lr in such a manner that the center of the power transmitting coil 10 and the center of the power receiving coil 20 match each other in plan view, and as illustrated in FIG. 5, power transfer is sometimes performed in a state where the center of the power receiving coil 20 is displaced from the center of the power transmitting coil 10 (that is, a state where the center of the power receiving coil 20 is located above the winding portion of the power transmitting coil 10). In this case, as described with reference to FIG. 10, in the magnetic flux B generated in the power transmitting coil 10, there is generated a portion that passes through the magnetic member 21 without being interlinked with the power receiving coil 20. The generation of such a magnetic flux causes increase of inductance of the power transmitting coil 10, resulting in lowering of power transfer efficiency, as described above.

However, in practice, the magnetic member 21 according to the present embodiment is not a single magnetic body, and it is constituted by four magnetic bodies 21a to 21d arranged in a matrix to be spaced from each other as illustrated also in FIG. 5. The gap with the width s1 between the magnetic bodies 21a to 21d is nothing but a magnetic gap as viewed from the magnetic flux passing through the magnetic member 21 without being interlinked with the power receiving coil 20, and the gap increases magnetic resistance of the magnetic member 21. Therefore, with the magnetic member 21 according to the present embodiment, it is possible to reduce the magnetic flux passing through the magnetic member 21 without being interlinked with the power receiving coil 20, as compared to a case where the magnetic member 21 is constituted by a single magnetic body.

Referring back to FIG. 2, this point is described again in more detail. A magnetic flux B1 illustrated in FIG. 2 represents a portion of the magnetic flux generated in the power transmitting coil 10, which is interlinked with the power receiving coil 20, and a magnetic flux B2 represents a portion passing through the magnetic member 21 without being interlinked with the power receiving coil 20. The magnetic flux B1 is interlinked with the power receiving coil 20 and therefore causes generation of alternating-current power in the power receiving coil 20. Accordingly, the magnetic flux B1 functions to transmit power from the wireless power transmitting device Us to the wireless power receiving device Ur. Meanwhile, the magnetic flux B2 is not interlinked with the power receiving coil 20, and therefore does not cause generation of alternating-current power in the power receiving coil 20 and does not function to transmit power from the wireless power transmitting device Us to the wireless power receiving device Ur.

According to the present embodiment, passing of the magnetic flux B2 through the magnetic member 21 is prevented by the gap with the width s1 provided in the magnetic member 21. Therefore, it is possible to reduce the amount of the magnetic flux B2 as compared to a case where no gap is provided in the magnetic member 21, and thus increase of inductance of the power transmitting coil 10 caused by generation of the magnetic flux B2 is suppressed, resulting in high power transfer efficiency.

Next, a suitable value for the width s1 is described with reference to experimental results. The width s1 cannot take any value, but there is a suitable range for the width s1. When the width s1 is too small, it is not possible to sufficiently suppress a change amount of inductance of the power transmitting coil 10 caused by a displacement of the power receiving coil 20. On the other hand, when the width s1 is too large, magnetic coupling between the power transmitting coil 10 and the power receiving coil 20 is lowered, and an original function of the wireless power transmission system S, that is, power transfer, cannot be realized. In the following descriptions, from such a viewpoint, a suitable range for the width s1 is defined.

In the following descriptions, three parameters d1, d2, and g are used as parameters representing the size of the wireless power transmission system S, in addition to the width s1. As illustrated in FIGS. 2 and 3B, the parameter d1 is a parameter representing a maximum width (a length of the longest one among straight lines that pass through a coil center and reach different outer peripheries of the coil from each other) of the power receiving coil 20. As illustrated in FIG. 2, the parameter d2 is a parameter representing a maximum width (a length of the longest one of straight lines that pass through a coil center and reach different outer peripheries of that coil from each other) of the power transmitting coil 10. As illustrated in FIG. 2, the parameter g is a parameter representing a facing distance between the power transmitting coil 10 and the power receiving coil 20. In this experiment, the parameters d1, d2, and g were set to 300 mm, 500 mm, and 100 mm, respectively.

In addition, in this experiment, maximum widths (each of which is a length of the longest one of lines that pass through a coil center and reach different outer peripheries of the coil opening from each other) of the openings 10a and 20a were set to 200 mm and 100 mm, respectively. Further, the power receiving coil 20 was arranged in such a manner that its center was 100 mm away from the center of the power transmitting coil 10 in an x-direction (a direction parallel to one side of the power transmitting coil 10 wound in a substantially square shape) illustrated in FIG. 5 and 100 mm away therefrom in a y-direction (a direction perpendicular to the x-direction in a wound plane of the power transmitting coil 10).

Figure 6A:
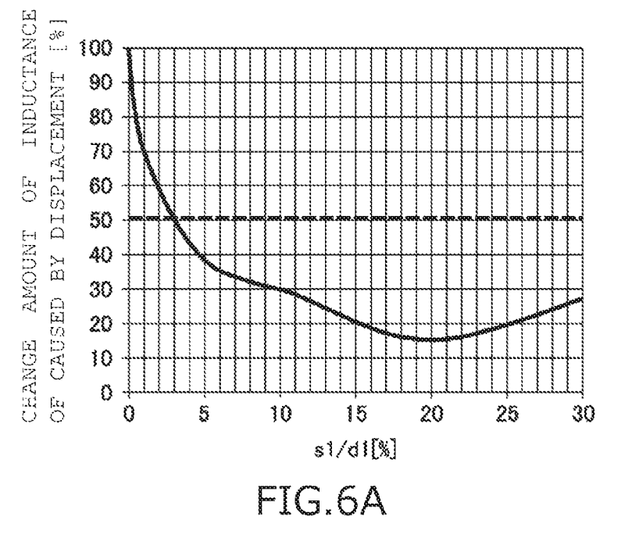
FIG. 6A is a graph illustrating a change of a change amount of inductance of the power transmitting coil caused by a displacement of the power receiving coil with respect to s1/d1.
Figure 6B:
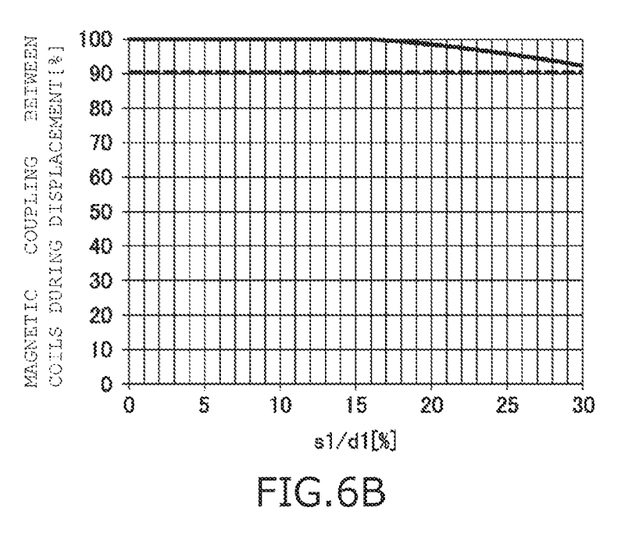
FIG. 6B is a graph illustrating a change of magnetic coupling between the power transmitting coil and the power receiving coil while the power receiving coil is displaced with respect to s1/d1.
Figure 7A:
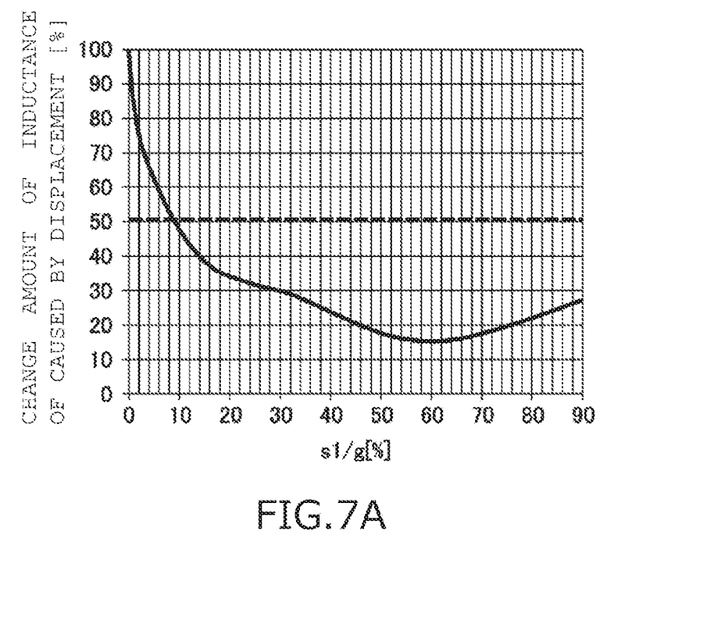
FIG. 7A is a graph illustrating a change of a change amount of inductance of the power transmitting coil caused by a displacement of the power receiving coil with respect to s1/g.
Figure 7B:
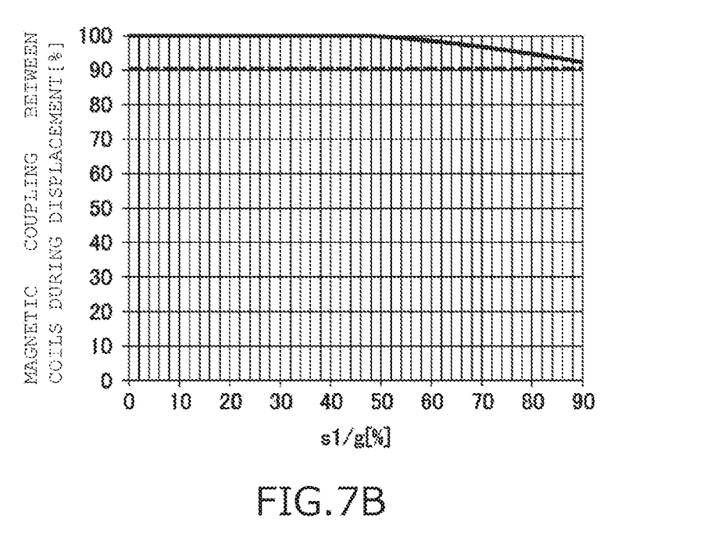
FIG. 7B is a graph illustrating a change of magnetic coupling between the power transmitting coil and the power receiving coil while the power receiving coil is displaced with respect to s1/g.
Figure 8A:
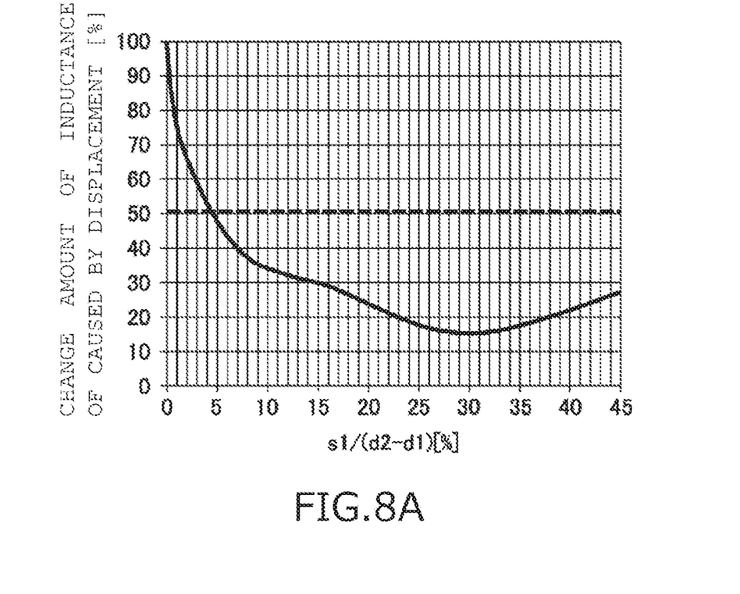
FIG. 8A is a graph illustrating a change of a change amount of inductance of the power transmitting coil caused by a displacement of the power receiving coil with respect to s1/(d2−d1)
Figure 8B:
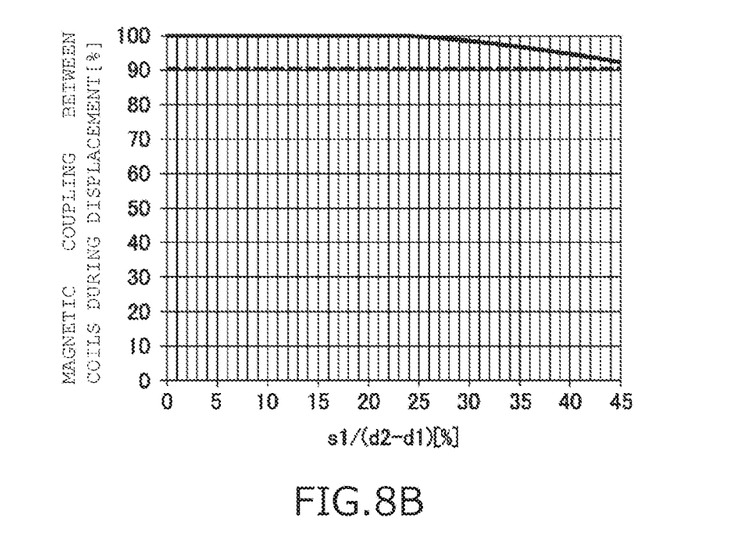
FIG. 8B is a graph illustrating a change of magnetic coupling between the power transmitting coil and the power receiving coil while the power receiving coil is displaced with respect to s1/(d2−d1)

FIG. 6A is a graph illustrating a change of a change amount of inductance of the power transmitting coil 10 caused by a displacement of the power receiving coil 20 with respect to s1/d1, and FIG. 6B is a graph illustrating a change of magnetic coupling between the power transmitting coil 10 and the power receiving coil 20 while the power receiving coil 20 is displaced with respect to s1/d1. FIG. 7A is a graph illustrating a change of a change amount of inductance of the power transmitting coil 10 caused by a displacement of the power receiving coil 20 with respect to s1/g, and FIG. 7B is a graph illustrating a change of magnetic coupling between the power transmitting coil 10 and the power receiving coil 20 while the power receiving coil 20 is displaced with respect to s1/g. FIG. 8A is a graph illustrating a change of a change amount of inductance of the power transmitting coil 10 caused by a displacement of the power receiving coil 20 with respect to s1/(d2−d1), and FIG. 8B is a graph illustrating a change of magnetic coupling between the power transmitting coil 10 and the power receiving coil 20 while the power receiving coil 20 is displaced with respect to s1/(d2−d1). In all the graphs, the change amount or magnetic coupling obtained for s1=0 mm was assumed to be 100%, and the experiment was performed in a range where the width s1 is 0 mm or more and 90 mm or less (that is, 0%≤s1/d1≤30%, 0%≤s1/g≤90%, 0%≤s1/(d2−d1)≤45%).

It is preferable that the change amount of inductance of the power transmitting coil 10 caused by a displacement of the power receiving coil 20 is suppressed to 50% or less (at a level below the broken line in FIGS. 6A, 7A, and 8A). It is found from FIG. 6A that s1/d1 satisfying this condition is 3% or more. Similarly, s1/g satisfying this condition is 10% or more (FIG. 7A), and s1/(d2−d1) satisfying this condition is 5% or more (FIG. 8A). Therefore, it can be said that it is possible to sufficiently suppress the change amount of inductance of the power transmitting coil 10 caused by a displacement of the power receiving coil 20, if any of the conditions that the width s1 is 3% or more of the maximum width d1 of the power receiving coil 20, the width s1 is 10% or more of the facing distance g between the power transmitting coil 10 and the power receiving coil 20, and the width s1 is 5% or more of a difference d2−d1 between the maximum width d2 of the power transmitting coil 10 and the maximum width d1 of the power receiving coil 20 is satisfied.

Further, it is preferable to suppress lowering of magnetic coupling between the power transmitting coil 10 and the power receiving coil 20 to 10% or less as compared to a case of s1=0 (at a level above the broken line in FIG. 6B). This condition is satisfied in the entire range of the width s1 for which this experiment was performed. Therefore, it can be said that it is possible to suppress lowering of magnetic coupling between the power transmitting coil 10 and the power receiving coil 20 to 10% or less, if any of the conditions that the width s1 is 30% or less of the maximum width d1 of the power receiving coil 20, the width s1 is 90% or less of the facing distance g between the power transmitting coil 10 and the power receiving coil 20, and the width s1 is 45% or less of the difference d2−d1 between the maximum width d2 of the power transmitting coil 10 and the maximum width d1 of the power receiving coil 20 is satisfied.

From the above results, it can be said that the suitable range for the width s1 is 3% or more and 30% or less of the maximum width d1 of the power receiving coil 20, is 10% or more and 90% or less of the facing distance g between the power transmitting coil 10 and the power receiving coil 20, or is 5% or more and 45% or less of the difference d2−d1 between the maximum width d2 of the power transmitting coil 10 and the maximum width d1 of the power receiving coil 20. By setting the width s1 to a value in this range, it is possible to suppress the change of inductance of the power transmitting coil 10 to 50% or less of that in a case of s1=0 and to suppress lowering of magnetic coupling between the power transmitting coil 10 and the power receiving coil 20 to 10% or less of that in a case of s1=0, even when a displacement has occurred in a relation between the planar positions of the power transmitting coil 10 and the power receiving coil 20.

As described above, according to the wireless power transmission system S of the present embodiment, it is possible to efficiently suppress generation of a magnetic flux passing through the magnetic member 21 without being interlinked with the power receiving coil 20. As a result, it is possible to suppress a change of inductance of the power transmitting coil 10 even in a case where a displacement has occurred in a relation between planar positions of the power transmitting coil 10 and the power receiving coil 20. Further, although there is a possibility that providing a magnetic gap within the magnetic member 21 causes lowering of magnetic coupling between the power transmitting coil 10 and the power receiving coil 20, the wireless power transmission system S according to the present embodiment can also suppress such lowering of magnetic coupling.

Further, according to the wireless power transmission system S of the present embodiment, the magnetic member 21 is constituted by four magnetic bodies 21a to 21d arranged in a matrix. Therefore, it is possible to suppress the change of inductance of the power transmitting coil 10 with respect to a positional displacement in all directions.

Furthermore, according to the wireless power transmission system S of the present embodiment, the size and the arrangement of the magnetic bodies 21a to 21d are determined in such a manner that a total area of regions of the opening 20a, which overlap the respective magnetic bodies 21a to 21d in plan view, is 10% or more of an area of the opening 20a it its entirety. Therefore, a magnetic path interlinked with the power receiving coil 20 can be easily formed. As a result, it is possible to effectively suppress lowering of magnetic coupling between the power transmitting coil 10 and the power receiving coil 20.

In addition, according to the wireless power transmission system S of the present embodiment, each of the magnetic bodies 21a to 21d is constituted by an aggregate of the magnetic pieces 22, and therefore mechanical vibration resistance of each of the magnetic bodies 21a to 21d is improved. Accordingly, it is possible to provide a power receiving coil unit Lr suitable for being mounted in a mobile device and a moving body.

Further, according to the wireless power transmission system S of the present embodiment, it is possible to make magnetic resistance between two adjacent magnetic pieces 22 among the magnetic pieces 22 constituting each of the magnetic bodies 21a to 21d sufficiently small, because a separation distance (the width s2) between the two adjacent magnetic pieces 22 is set to 50% or less of the width s1. Therefore, it is possible to effectively suppress the change of inductance of the power transmitting coil 10, while effectively suppressing lowering of magnetic coupling between the power transmitting coil 10 and the power receiving coil 20.

It is apparent that the present invention is not limited to the above embodiments, but may be modified and changed without departing from the scope and spirit of the invention.

In the above embodiment, as an example, there has been described a case in which the wound area of the power transmitting coil 10 is larger than that of the power receiving coil 20. However, the present invention can be also suitably applied to a case in which the wound area of the power receiving coil 20 is larger than that of the power transmitting coil 10. In this case, it suffices that the magnetic member 11 is constituted by a plurality of magnetic bodies spaced from each other, each of the magnetic bodies is arranged to overlap both a winding portion of the power transmitting coil 10 and the opening 10a in plan view, and a separation distance between two adjacent magnetic bodies among these magnetic bodies is set to 3% or more and 30% or less of a maximum width of the power receiving coil 20.

As described above, according to the present embodiment, there is provided a coil unit for wirelessly transmitting or receiving power by magnetic coupling with a first coil wound in a planar spiral shape, the coil unit comprising a second coil that is wound in a planar spiral shape with a smaller wound area than that of the first coil and has an opening, and a magnetic member that is arranged along a surface of the second coil on an opposite side as viewed from the first coil, wherein the magnetic member is constituted by a plurality of magnetic bodies being spaced from each other, each of the magnetic bodies is arranged to overlap both a winding portion of the second coil and the opening in plan view, and a first distance that is a separation distance between two adjacent magnetic bodies among the magnetic bodies is 3% or more and 30% or less of a maximum width of the second coil.

According to the present embodiment, because a magnetic gap with a width of 3% or more of the maximum width of the second coil is formed within the magnetic member, it is possible to efficiently suppress generation of a magnetic flux passing through the magnetic member without being interlinked with the second coil. As a result, even in a case where a displacement has occurred in a relation between planar positions of the first coil and the second coil, it is possible to suppress a change of inductance of the first coil. When a magnetic gap is provided in the magnetic member, there is a possibility that magnetic coupling between the first coil and the second coil is lowered. However, because the width of the magnetic gap is set to 30% or less of the maximum width of the second coil, it is possible to suppress such lowering of magnetic coupling.

In the coil unit described above, the magnetic bodies can be constituted by four or more magnetic bodies arranged in a matrix. With this configuration, it is possible to suppress the change of inductance of the first coil with respect to a positional displacement in all directions.

In each of the coil units described above, a total area of regions of the opening that overlap the respective magnetic bodies in plan view can be 10% or more of an area of the opening in its entirety. With this configuration, a magnetic path that is interlinked with the second coil can be easily formed, and thus it is possible to more effectively suppress lowering of magnetic coupling between the first coil and the second coil.

In each of the coil units described above, each of the magnetic bodies can be constituted by an aggregate of a plurality of magnetic pieces. With this configuration, mechanical vibration resistance of each magnetic body is increased, and thus it is possible to provide a coil unit suitable for being mounted in a mobile device and a moving body.

In this coil unit, a second distance that is a separation distance between two adjacent magnetic pieces among the magnetic pieces constituting one of the magnetic bodies is 50% or less of the first distance. With this configuration, magnetic resistance between the two adjacent magnetic pieces can be made sufficiently small. Therefore, it is possible to effectively suppress the change of inductance of the first coil while effectively suppressing lowering of magnetic coupling between the first coil and the second coil.

In each of the coil units described above, the first distance can be 10% or more and 90% or less of a facing distance between the first coil and the second coil. Also with this configuration, it is possible to suppress the change of inductance of the first coil caused by a displacement occurring in a relative positional relation between the first coil and the second coil and to suppress lowering of magnetic coupling between the first coil and the second coil caused by providing a magnetic gap within the magnetic member.

In each of the coil units described above, the first distance can be 5% or more and 45% or less of a difference between a maximum width of the first coil and the maximum width of the second coil. Also with this configuration, it is possible to suppress the change of inductance of the first coil caused by a displacement occurring in a relative positional relation between the first coil and the second coil and to suppress lowering of magnetic coupling between the first coil and the second coil caused by providing a magnetic gap within the magnetic member.

A wireless power transmitting device according to the present embodiment is a wireless power transmitting device comprising a coil unit that transmits power wirelessly and a power converting circuit that converts input direct-current power to alternating-current power and supplies the alternating-current power to the coil unit, wherein the coil unit is any of the coil units described above.

A wireless power receiving device according to the present embodiment is a wireless power receiving device comprising a coil unit that receives power wirelessly and a rectifying circuit that converts alternating-current power received by the coil unit to direct-current power, wherein the coil unit is any of the coil units described above.

A wireless power transmission system according to the present embodiment is a wireless power transmission system for wirelessly transferring power, comprising a power transmitting coil unit that transmits power wirelessly and a power receiving coil unit that receives power wirelessly, wherein either one of the power transmitting coil unit and the power receiving coil unit is any of the coil units described above.

According to the present embodiment, it is possible to suppress the change of inductance of a first coil caused by a displacement occurring in a relative positional relation between the first coil and a second coil and to suppress lowering of magnetic coupling between the first coil and the second coil caused by providing a magnetic gap within a magnetic member.

What is claimed is:

1. A coil unit for wirelessly transmitting or receiving power by magnetic coupling with a first coil wound in a planar spiral shape, the coil unit comprising:
    a second coil that is wound in a planar spiral shape with a smaller wound area than that of the first coil and has an opening; and
    a magnetic member that is arranged along a surface of the second coil on an opposite side as viewed from the first coil, wherein
    the magnetic member is constituted by a plurality of magnetic bodies being spaced from each other,
    each of the magnetic bodies is arranged to overlap both a winding portion of the second coil and the opening in plan view, and
    a first distance that is a separation distance between two adjacent magnetic bodies among the magnetic bodies is 3% or more and 30% or less of a maximum width of the second coil.

2. The coil unit as claimed in claim 1, wherein the magnetic bodies are constituted by four or more magnetic bodies arranged in a matrix.

3. The coil unit as claimed in claim 1, wherein a total area of regions of the opening that overlap the respective magnetic bodies in plan view is 10% or more of an area of the opening in its entirety.

4. The coil unit as claimed in claim 1, wherein each of the magnetic bodies is constituted by an aggregate of a plurality of magnetic pieces.

5. The coil unit as claimed in claim 4, wherein a second distance that is a separation distance between two adjacent magnetic pieces among the magnetic pieces constituting one of the magnetic bodies is 50% or less of the first distance.

6. The coil unit as claimed in claim 1, wherein the first distance is 10% or more and 90% or less of a facing distance between the first coil and the second coil.

7. The coil unit as claimed in claim 1, wherein the first distance is 5% or more and 45% or less of a difference between a maximum width of the first coil and the maximum width of the second coil.

8. A wireless power transmitting device comprising:
    a coil unit that transmits power wirelessly; and
    a power converting circuit that converts input direct-current power to alternating-current power and supplies the alternating-current power to the coil unit, wherein the coil unit is configured to wirelessly transmit power by magnetic coupling with a first coil wound in a planar spiral shape and comprises:
    a second coil that is wound in a planar spiral shape with a smaller wound area than that of the first coil and has an opening; and
    a magnetic member that is arranged along a surface of the second coil on an opposite side as viewed from the first coil, wherein
    the magnetic member is constituted by a plurality of magnetic bodies being spaced from each other,
    each of the magnetic bodies is arranged to overlap both a winding portion of the second coil and the opening in plan view, and
    a first distance that is a separation distance between two adjacent magnetic bodies among the magnetic bodies is 3% or more and 30% or less of a maximum width of the second coil.

9. A wireless power receiving device comprising:
    a coil unit that receives power wirelessly; and
    a rectifying circuit that converts alternating-current power received by the coil unit to direct-current power, wherein
    the coil unit is configured to wirelessly receive power by magnetic coupling with a first coil wound in a planar spiral shape and comprises:
    a second coil that is wound in a planar spiral shape with a smaller wound area than that of the first coil and has an opening; and
    a magnetic member that is arranged along a surface of the second coil on an opposite side as viewed from the first coil, wherein
    the magnetic member is constituted by a plurality of magnetic bodies being spaced from each other,
    each of the magnetic bodies is arranged to overlap both a winding portion of the second coil and the opening in plan view, and
    a first distance that is a separation distance between two adjacent magnetic bodies among the magnetic bodies is 3% or more and 30% or less of a maximum width of the second coil.

10. A wireless power transmission system for wirelessly transferring power, comprising:
    a power transmitting coil unit that transmits power wirelessly; and
    a power receiving coil unit that receives power wirelessly, wherein
    either one of the power transmitting coil unit and the power receiving coil unit is configured to wirelessly transmit or receive power by magnetic coupling with a first coil wound in a planar spiral shape and comprises:
    a second coil that is wound in a planar spiral shape with a smaller wound area than that of the first coil and has an opening; and
    a magnetic member that is arranged along a surface of the second coil on an opposite side as viewed from the first coil, wherein
    the magnetic member is constituted by a plurality of magnetic bodies being spaced from each other,
    each of the magnetic bodies is arranged to overlap both a winding portion of the second coil and the opening in plan view, and a first distance that is a separation distance between two adjacent magnetic bodies among the magnetic bodies is 3% or more and 30% or less of a maximum width of the second coil.

* * * * *